Dec. 29, 1953

W. E. SAXE 2,664,260

AUTOMATIC DISPENSING, WEIGHING, AND
RECORDING APPARATUS

Filed April 21, 1951

INVENTOR.
WALTER E. SAXE
BY HIS ATTORNEYS.
HARRIS, KIECH, FOSTER & HARRIS
BY

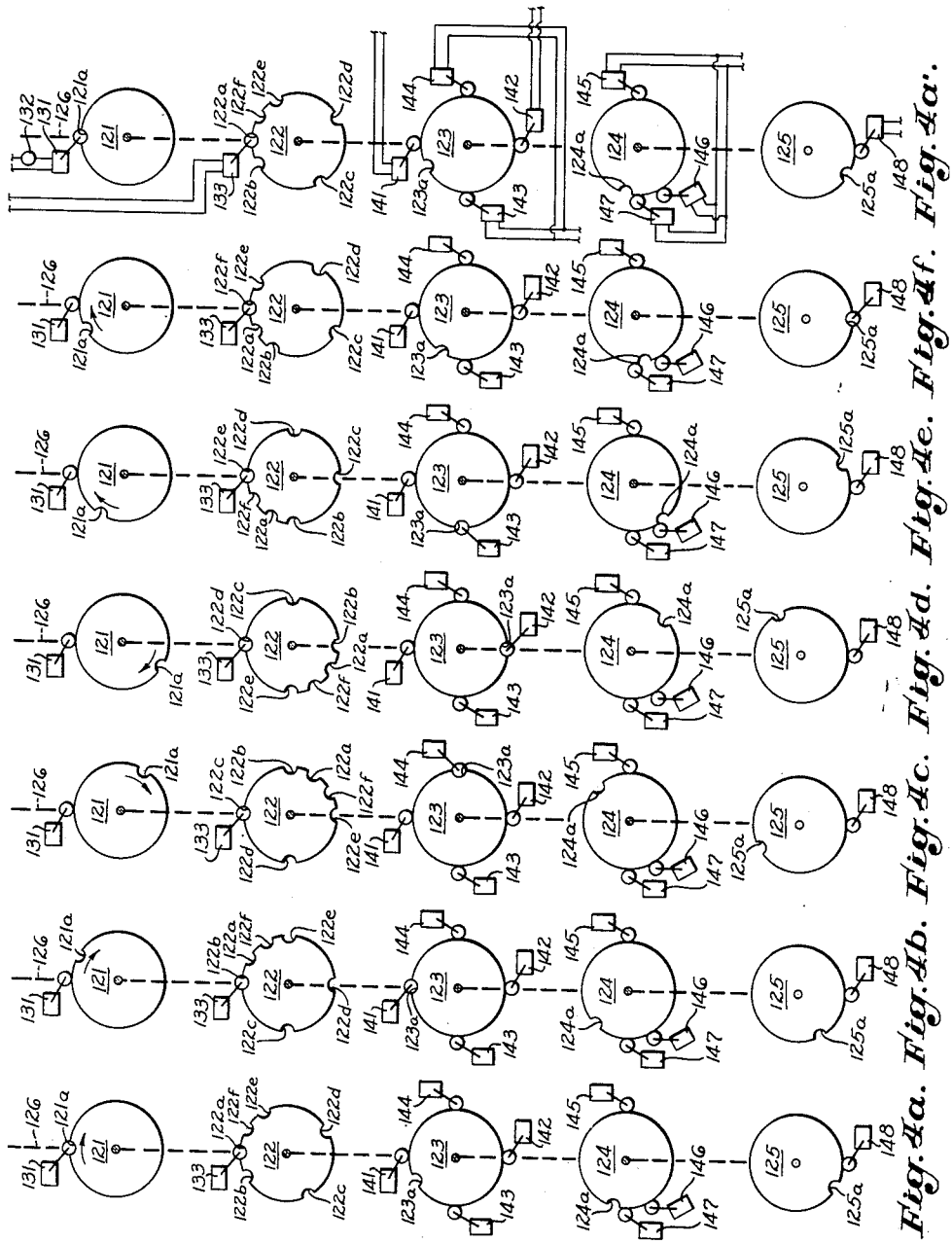

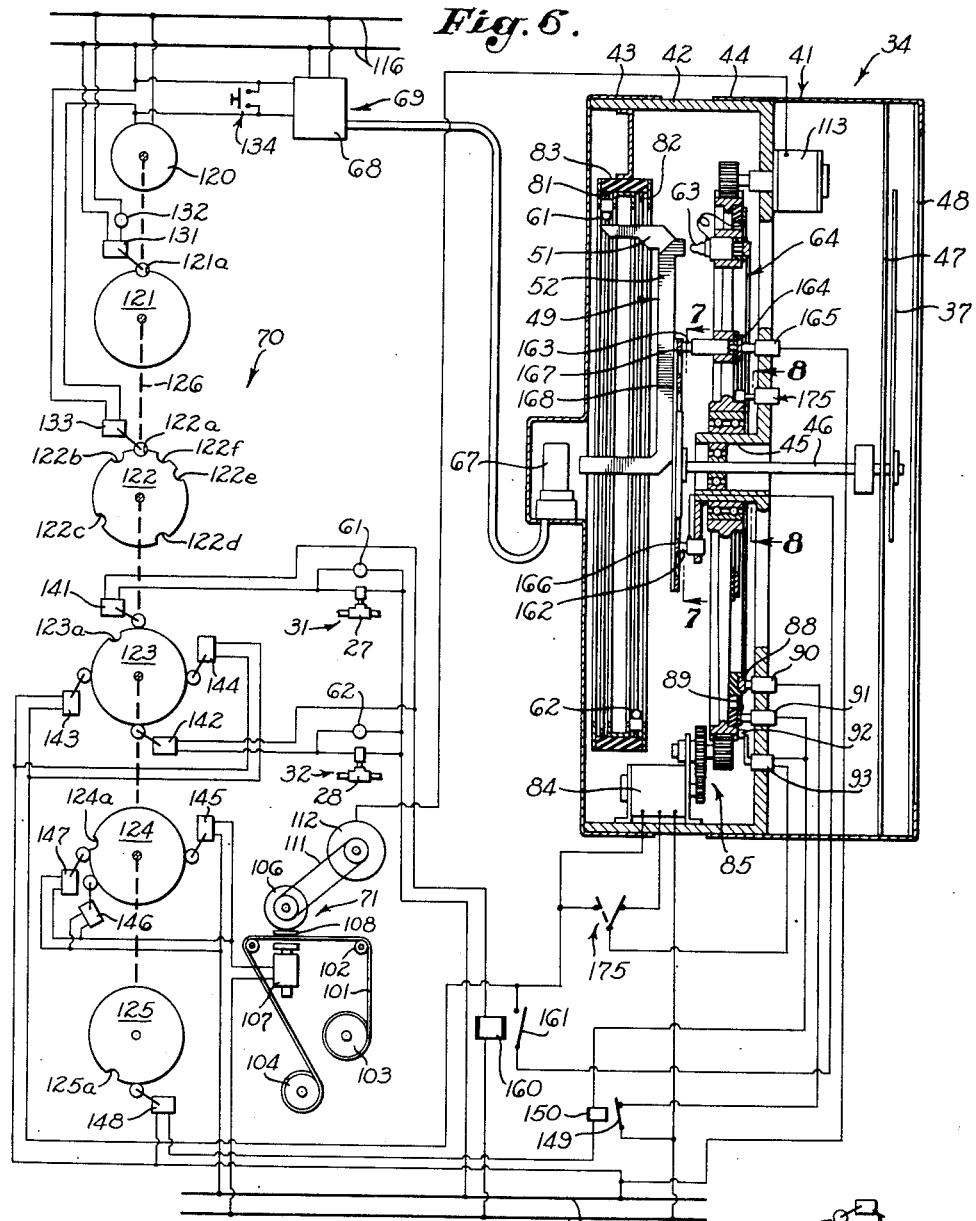

UNITED STATES PATENT OFFICE 2,664,260

AUTOMATIC DISPENSING, WEIGHING, AND RECORDING APPARATUS

Walter E. Saxe, Pasadena, Calif., assignor to The Conveyor Company, Inc., Los Angeles, Calif., a corporation of California Application April 21, 1951, Serial No. 222,176

24 Claims. (Cl. 249—14)

The present invention relates in general to an apparatus for dispensing one or more materials in measured quantities, and, more particularly, to an apparatus for recording the quantities of the materials dispensed thereby. This application discloses features which are disclosed and claimed in one or more of my copending applications Serial No. 771,013, filed August 28, 1947 (now Patent No. 2,625,301), Serial No. 16,251, filed March 22, 1948, Serial No. 16,252, filed March 22, 1948 (now Patent No. 2,625,300), and Serial No. 68,906, filed January 3, 1949.

In general, it is an object of the invention to provide an apparatus for actuating one or more dispensing devices in such a manner that each device dispenses a measured quantity of material from a source with which it is associated. More specifically, it is an object of the invention to provide an apparatus for actuating the dispensing devices under the control of means responsive to the quantities of the materials dispensed by the devices.

As an example, an apparatus embodying the fundamental principles of the invention may be employed in connection with an installation wherein the sources of the materials referred to in the preceding paragraph are storage bins and the dispensing devices include gates or other discharge controlling devices. Such installations, an example of which may be found in my Patent No. 2,336,130, issued December 7, 1943, are used extensively for combining the materials used in concrete, for example, although other uses therefor are well known to those skilled in the art.

Since the invention is particularly applicable to and was originally embodied in a dispensing apparatus which is responsive to the weights of the materials dispensed thereby, I prefer to consider such an embodiment herein for purposes of illustration. However, the invention may be embodied in an apparatus responsive to variables other than the weights of the dispensed materials and it will be understood, therefore, that I do not desire to be limited to the particular embodiments which I have elected to disclose herein. For example, as will be apparent to those skilled in the art, various features of the invention may be incorporated in apparatuses responsive to such characteristics of the dispensed materials as their volumes, pressures, and the like.

Considering the nature of the invention in more detail, it is a primary object to provide an apparatus having one or more material dispensing devices and having photoelectrically controlled means responsive to the quantities of the materials dispensed by the devices for actuating and subsequently deactuating the devices in sequence in such a manner that each device dispenses a predetermined quantity of material from a source with which it is associated. More specifically, an object in this connection is to provide an apparatus having control means for actuating and subsequently deactuating the dispensing devices in sequence, and having photoelectric switching means operable whenever a predetermined quantity of material has been dispensed by each dispensing device for regulating the operation of the control means.

Another object of the invention is to provide an apparatus having a primary rotor which is rotatable through distances proportional to the quantities of the materials dispensed by the dispensing devices, and having a plurality of primary actuating devices which are spaced apart along the path of the primary rotor and which are adapted to cooperate therewith to control the operation of the dispensing devices in such a manner as to dispense predetermined quantities of the materials. A related object is to provide an apparatus wherein the primary actuating devices are light sources which, in cooperation with the primary rotor, operate the photo-electric switching means to cause the control means to actuate and subsequently deactuate the dispensing devices in sequence. A further object in this connection is to provide an apparatus wherein the primary rotor includes means for conveying light from the various primary light sources to a single, stationary photoelectric cell, the primary rotor being nonlinear and being formed of a material which is capable of conveying light along an irregular path.

It will be understood that the primary rotor is rotated through distances proportional to the quantities of the materials dispensed by the dispensing devices by means responsive to the quantities of the materials so dispensed. In the particular illustrative embodiments hereinafter described in detail, the quantities of the dispensed materials are measured in terms of their weights by scale means responsive to the weights of the dispensed materials, the scale means including a rotatable shaft on which the aforementioned primary rotor is mounted.

One of the most important objects of the invention is to provide a recording means for recording the quantities of the dispensed materials which is, in effect, driven by the primary rotor through a non-mechanical connection so that the recording means imposes no load whatsoever on the measuring means. With this arrangement, the recording means in no way affects the accuracy and sensitivity of the measuring means, which is an important feature of the invention.

Another important object of the invention is to provide an apparatus which includes in effect a photoelectric drive between the measuring means and the recording means so that the latter imposes no load on the measuring means.

More particularly, another object of the invention is to provide an apparatus having a recording means which includes a secondary rotor coaxial with the primary rotor and carrying a secondary actuating device, such as a secondary light source, the primary rotor being adapted to register with the secondary light source and to convey light therefrom to the single photocell of the photoelectric switching means. A related object is to provide an apparatus wherein the aforementioned control means causes the secondary rotor to rotate into a position such that the secondary light source registers with the primary rotor after each dispensing device has dispensed a quantity of the material associated therewith, the primary rotor thereafter conveying light from the secondary light source to the photoelectric switching means to cause the latter to cause the control means to actuate the recording means to record the quantity of material dispensed by such dispensing device. A related object in connection with one embodiment of the invention is to provide an apparatus having follow-up means for causing the secondary light source on the secondary rotor to follow the primary rotor as the latter is rotated in response to dispensing of materials by each dispensing device so that a minimum amount of time is required to cause the secondary light source on the secondary rotor to register with the primary rotor after such dispensing device has dispensed the desired quantity of material.

Another object is to provide an apparatus wherein the recording means includes means operable by the control means for moving a recording medium into operative engagement with recording indicia on an element of the recording means whenever the photoelectric switching means receives light from the secondary light source on the secondary rotor through the primary rotor upon registration of the secondary light source with the primary rotor.

An object in connection with one embodiment of the invention is to provide an apparatus wherein the recording indicia are disposed on the secondary rotor and an object in connection with another embodiment is to provide a recording means which includes an auxiliary recording element having the recording indicia thereon. Another object in connection with the latter embodiment is to provide means operatively connecting the secondary rotor and the auxiliary recording element for rotating the auxiliary recording element in synchronism with the secondary rotor.

Another object is to provide a dispensing and recording apparatus wherein the control means energizes the primary and secondary light sources selectively at the proper points in the operating cycle of the apparatus so as to avoid interference between these light sources.

Another object of the invention is to provide an apparatus having home selector means for causing the secondary rotor, and the auxiliary recording element in the embodiment including such element, to return to their rest positions, corresponding to readings of zero on the measuring and recording means, by the shortest possible route. More particularly, an object in this connection is to provide an apparatus wherein the secondary rotor is rotatable through an angle of 360° and wherein the home selector means causes the secondary rotor to return to zero in its original direction of rotation if it has rotated more than 180° by the time the last material has been dispensed, and to return to zero in the reverse direction if it has rotated through an angle of less than 180° by the time the last material has been dispensed.

The foregoing objects and advantages of the present invention, together with various other objects and advantages thereof which will become apparent, may be attained with the exemplary embodiments of the invention which are illustrated in the accompanying drawings and which are described in detail hereinafter. Referring to the drawings:

Fig. 4 is a collective term for Figs. 4a, 4b, 4c, 4d, 4e, 4f, and 4a', which are a series of diagrammatic views illustrating successive operating positions of the elements of the control means of the automatic dispensing and recording apparatus of the invention illustrated in Figs. 2 and 3;

Fig. 5 is a fragmentary view of an alternative embodiment of the invention which may be employed as a modification of the embodiment of Figs. 2 to 4, or as a modification of the embodiment of the hereinafter discussed embodiment of Figs. 6 and 7;

Figures 1, 2:
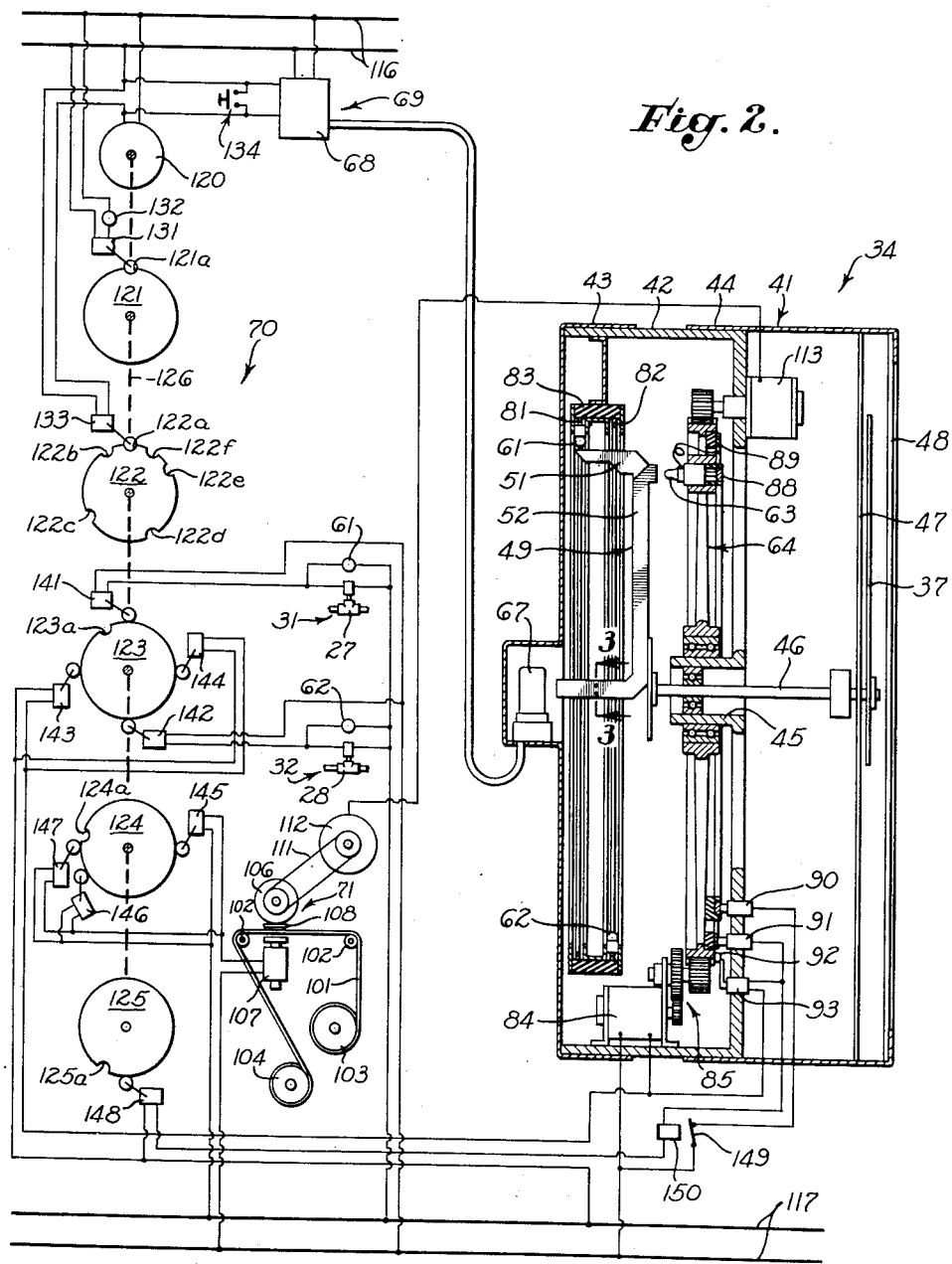
Fig. 1 is a utility view on a reduced scale of an installataion in which the apparatus of the invention may be incorporated.
Fig. 2 is a semidiagrammatic view of one embodiment of the apparatus of the invention.

Fig. 6 is a semidiagrammatic view similar to Fig. 2 but illustrating another embodiment of the invention; and Figs. 7 and 8 are fragmentary sectional views respectively taken along the broken lines 7—7 and 8—8 of Fig. 6.

As previously indicated, I have elected to disclose the invention as applied to embodiments for dispensing materials by weight and for recording the dispensed weights of the materials with the understanding that those skilled in the art may readily apply the invention to dispensing and recording by characteristics other than weight, such as volume, pressure, level in a container, and the like. Also, I have elected to disclose embodiments for dispensing and recording the weights of two materials with the understanding that the invention may be employed in connection with either a lesser number or larger numbers of materials. For example, the embodments disclosed may be employed to dispense and record the weights of more than two materials merely by adding elements thereto in a manner which will become apparent. Also, the embodiments disclosed may be employed to dispense and record the weight of one material without modification. Further, as will be discussed hereinafter, the embodiments disclosed may be employed to weigh and record without dispensing. Consequently, it will be understood that the embodiments to be described are merely illustrative of other embodiments coming within the scope of the invention.

Referring first to Fig. 1 of the drawings, illustrated therein in highly simplified form is an installation in which the present invention may be incorporated, this installation being designed for use in weighing out the materials for a batch of concrete and for dumping the resulting batch into a truck, for example. As illustrated in Fig. 1 of the drawings, this installation includes a frame 20 which carries a hopper divided into bins 21 and 22 for different materials, such as sand and cement, for example. The bins 21 and 22 are respectively provided with gates 23 and 24 which may be opened to dump the materials from the respective bins. These gates may be actuated in any suitable manner, as by air cylinders 25 and 26 respectively connected to the gates 23 and 24. The air cylinders 25 and 26 may be controlled by solenoid valves 27 and 28, respectively, the solenoid valves being shown in Fig. 2 of the drawings. As a matter of convenience, the gate 23, the air cylinder 25 and the solenoid valve 27 are regarded as a dispensing device 31, the gate 24, the air cylinder 26 and the solenoid valve 28 being regarded as providing a dispensing device 32. While the terms "dispensing device 31" and "dispensing device 32" will be applied to these elements hereinafter and in the claims for convenience, it will be understood that these terms are not to be regarded as limited to such elements since any suitable elements may be incorporated therein. Thus, it will be understood that the term "dispensing device" as used herein is intended to include any element or combination of elements for dispensing a material without restriction to the specific elements disclosed.

Reverting to Fig. 1 of the drawings, when either of the dispensing devices 31 and 32 is actuated in a manner to be described, the material in the corresponding one of the bins 21 and 22 is discharged into a weigh hopper 33 which may be carried by the frame 20 sufficiently above ground level to permit a truck, or the like, to be driven thereunder, the weigh hopper being provided with a gate, not shown, which may be opened to dump the contents of the weigh hopper into such truck. The weigh hopper 33 is operatively connected to a scale or scale means 34 carried by the frame 20, as by being mounted on a beam 35 pivotally connected at one end to the frame and connected at its other end to a draft link or band 36, or the like, of the scale 34. Thus, as the materials in the bins 21 and 22 are discharged into the weigh hopper 33, the weights of the materials are indicated by a pointer 37 on the scale 34.

As will be discussed in more detail hereinafter, the dispensing device 31 is actuated to dispense a predetermined weight of the material in the bin 21 into the weigh hopper 33 under the control of the scale 34, the dispensing device 31 being deactuated to terminate discharge of the material in the bin 21 into the weigh hopper 33 as soon as the pointer 37 attains a predetermined indicium on the scale dial. Subsequently, the dispensing device 32 is actuated to dispense material from the corresponding bin 22, the dispensing device 32 also being deactuated after a predetermined weight of the material in the bin 22 has been dispensed into the weigh hopper 33 as indicated by the pointer 37. Also, the weights of the materials dispensed into the weigh hopper 33 are recorded by the invention.

Figure 3:
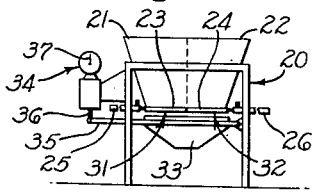
Fig. 3 is a fragmentary sectional view taken along the broken line 3—3 of Fig. 2.

With the foregoing general discussion of the invention in mind, the invention will now be considered in more detail, commencing with the embodiment illustrated in Figs. 2 to 4 of the drawings. Referring particularly to Fig. 2 of the drawings, the scale 34 includes a scale head 41 which is illustrated as including a housing formed in three sections 42, 43 and 44, these housing sections being provided with transverse walls and being provided with annular flanges arranged in telescoping relation. The transverse wall of the housing section 42 is provided with a central hub 45 containing a bearing for an indicator shaft 46 which is operatively connected to the draft link 36 in any suitable manner, not shown, to rotate through an angle proportional to the weight of the material or materials dispensed into the weigh hopper 33 as will be apparent to those skilled in the art. One end of the indicator shaft 46 extends through a scale dial 47 carried by the housing section 44 and carries the indicator or pointer 37, the latter moving over the scale dial as the indicator shaft rotates to indicate the weight of the material or materials dispensed into the weigh hopper 33. The scale dial 47 and the pointer 37 are covered by a face made of glass, or other transparent material, carried by the housing section 44.

Mounted on the opposite end of the indicator shaft 46 is a primary rotor 49 which is rotated in synchronism with the pointer 37 through the medium of the indicator shaft. As shown in Fig. 2 of the drawings, and also in Fig. 3 thereof, the primary rotor 49 includes two arms or wands 51 and 52 each formed of a material which is capable of conveying light along nonlinear or irregular paths. An example of such a material is methyl methacrylate, commonly known by the trade name "Lucite." The wand 51 is illustrated as generally U-shaped and is adapted to register at its outer end with successive primary actuating devices or light sources 61 and 62, the latter being illustrated as electric light bulbs. The wand 52 is generally L-shaped and is adapted to register at its outer end with a secondary actuating device or light source 63 which is mounted on and carried by a secondary rotor 64, the latter being rotatably mounted by means of suitable bearings on the hub 45 of the housing section 42. As will be discussed in more detail hereinafter, the secondary rotor 64 is, in effect, driven by the primary rotor 49 through a photoelectric connection with no mechanical connection therebetween so as to avoid imposing any load on the weight measuring means represented by the indicator shaft 46 and the elements associated therewith.

The inner ends of both wands 51 and 52 extend axially toward the rear of the scale head 41 and register at all times with a photoelectric cell 67 which is carried in a recess in the transverse wall of the housing section 43. Thus, whenever the outer end of either of the wands 51 and 52 registers with one of the light sources 61 to 63, such light source, when energized as will be described in more detail hereinafter, applies light to the photocell 67 through the corresponding one of the wands 51 and 52. The photocell 67 is connected to and cooperates with a photoelectric relay 68 to provide a photoelectric switching means 69 for energizing a control means 70 which, as will be described in more detail hereinafter, actuates and subsequently deactuates the dispensing devices 31 and 32 in sequence to dispense predetermined weights of the materials from the bins 21 and 22, and also actuates a recording means 71 for recording the dispensed weights.

As will be discussed in more detail hereinafter, the positions of the primary light sources 61 and 62 determine the weights of the materials dispensed from the bins 21 and 22. The positions of these light sources relative to the scale dial 47 may be varied in various ways. For example, as more fully disclosed in my aforementioned copending applications Serial No. 771,013 and Serial No. 16,251, the light sources 61 and 62 may be carried by rotatable rings 81 and 82, respectively, rotatably mounted on a support 83 carried by the housing section 42. As will be apparent, the primary light sources 61 and 62 may be positioned opposite any desired indicia on the scale dial 47 by rotating the rings 81 and 82 so as to cause the dispensing devices 31 and 32 to dispense any desired amounts of the materials in the bins 21 and 22, as more fully described hereinafter. Alternatively, a system of selectively energizable light sources similar to that disclosed in my aforementioned copending application Serial No. 16,252 may be employed, if desired. In order to prevent interference between the primary light sources 61 and 62 and the secondary light source 63, the former are energized only when the corresponding dispensing devices 31 and 32 are actuated, as by connecting the primary light sources 61 and 62 in parallel with the solenoid valves 27 and 28, respectively, as diagrammatically shown in Fig. 2 of the drawings.

Considering the recording means 71 in more detail, the secondary rotor 64 is rotated into a position such that the secondary light source 63 carried thereby registers with the outer end of the wand 52 after each material has been dispensed so as to produce a record of the weight of the dispensed material through the photoelectric switching means 69 and the control means 70 in a manner to be described in more detail hereinafter. The position of the secondary rotor 64, which may be regarded as an element of the recording means 71, is controlled by an electric synchronizing motor 84 which, through the photoelectric switching means 69 and the control means 70, synchronizes the positions of the secondary light source 63 and the wand 52 in a manner to be described. In the particular construction illustrated, the secondary rotor 64 takes the form of a gear which is driven by the synchronizing motor 84 through a gear train 85.

The secondary light source 63 is connected between, i. e., in series with, two contact rings 88 and 89 which are carried by and insulated from the secondary rotor or gear 64. The transverse wall of the housing section 42 carries brushes 90 and 91 which engage the rings 88 and 89, respectively, and which are connected to the control means 70 in a manner to be described. The secondary rotor 64 also carries an element 92 which is adapted to engage a zero limit switch 93 to de-energize the synchronizing motor 84 whenever the secondary light source 63 on the secondary rotor 64 reaches a position opposite the zero indicium on the scale dial 47 upon completion of an operating cycle, the limit switch being connected to the control means 70 in a manner also to be described hereinafter.

In the particular embodiment under consideration, the recording means 71 is adapted to print the weights of the dispensed material on a recording medium such as a paper tape which may be located remote from the scale head 41. The tape 101 is fed over rollers 102 from a supply drum 103 onto a drum 104 driven in any suitable manner, not shown. Adjacent the tape is a rotatable recording element which takes the form of a printing head 106 having indicia thereon matching the indicia on the scale dial 47. In other words, if the indicia on the scale dial 47 range from 0 to 10,000 pounds, for example, the printing head 106 is provided with circumferentially spaced indicia covering the same range. On the opposite side of the tape 101 from the printing head 106 is a solenoid 107 which, when energized, presses the tape into engagement with the printing head 106 to print on the tape the particular indicium facing the tape. The printing solenoid 107 is connected to the control means 70 in a manner to be described. The printing head 106 may print the weights of the dispensed materials on the tape 101 in various ways, as by providing a means, not shown, for inking the printing head. Alternatively, a carbon tape or ribbon 108 may be disposed between the recording tape 101 and the printing head 106 so that the indicium on the printing head which faces the recording tape is printed thereon through the medium of the carbon tape 108.

It will be understood that it is necessary to synchronize the positions of the printing head 106 and the secondary rotor 64 so that the indicium on the printing head which faces the recording tape 101 at any instant matches the indicium on the scale dial 47 opposite which the secondary light source 63 carried by the secondary rotor is disposed. For this purpose, the printing head 106 is connected, as by a chain 111, to a synchro or "Selsyn" 112 which, in turn, is operatively connected to a synchro 113 geared to the secondary rotor 64 in a manner not specifically shown but well known in the art. Thus, the system of synchros 112 and 113 maintains synchronism between the positions of the printing head 106 and the secondary rotor 64. Thus, the printing head 106 and the elements directly associated therewith may be located remote from the scale head 41 in instances where this is desirable.

Turning now to a detailed consideration of the control means 70, various electrical elements of the control means and various electrical elements associated therewith have been shown as connected across main power leads 116 in some instances and across main power leads 117 in the remainder purely as a matter of convenience. A timing motor 120 is connected across the leads 116 through the photorelay 68 so that the latter completes the circuit to the timing motor to energize it whenever light from one of the light sources 61 to 63 impinges on the photocell 67. The timing motor drives a plurality of timing discs 121 to 125, preferably through suitable reduction gearing, not shown. The discs 121 to 125 are all mounted on a common shaft, represented by the broken line 126, so that they rotate in synchronism.

The disc 121 is provided with a notch 121a in which a roller on a switch 131 is adapted to enter once per revolution of this disc to close the switch 131. The notch 121a on the disc 121 is disposed in a position such that the switch 131 is closed by entry of the roller thereon into the notch 121a at the beginning, or end, of each operating cycle of the apparatus. The switch 131 is connected across the leads 116 through a green light 132 which is energized by closure of the switch 131 to indicate that the apparatus is at the end of an operating cycle.

The next disc, 122, is provided with notches 122a, 122b, 122c, 122d, 122e and 122f therein, and disposed adjacent this disc is a switch 133 having a roller adapted to enter the various notches in this disc. The switch 133 is normally closed and opens whenever the roller thereon enters one of the notches in the disc 122. The switch 133 is connected in parallel with the switch in the photorelay 68 and in series with the timing motor 120 so that the timing motor is energized by the switch 133 whenever the roller of this switch is out of the notches in the disc 122. Also connected in parallel with the switch in the photo-relay 68 and in series with the timing motor 120 is a start switch 134. Thus, as will be apparent, the timing motor 120 may be energized by the start switch 134, by the switch in the motor relay 68 whenever light from one of the sources 61 to 63 falls on the photocell 67, or the switch 133 whenever the roller thereof is out of the notches in the disc 122.

The disc 123 is provided with a single notch 123a therein and adjacent this disc are four switches 141, 142, 143 and 144 each provided with a roller adapted to enter the notch 123a. The switches 141 to 144 are normally open, i. e., they close when the respective rollers thereon enter the notch 123a. The switch 141 is connected in series with the light source 61 and the solenoid valve 27 of the dispensing device 31, such elements being connected across the leads 117. Similarly, the switch 142 is connected in series with the primary light source 62 and the solenoid valve 28 of the dispensing device 32, such elements also being connected across the leads 117. Thus, whenever the roller of the switch 141 enters the notch 123a, the light source 61 is energized and the solenoid valve 27 is energized to open the gate 23 of the bin 21. Similarly, whenever the roller of the switch 142 enters the notch 123a, the light source 62 and the solenoid valve 28 are energized to open the gate 24 of the bin 22. The switches 143 and 144 are connected in parallel with respect to each other and are connected in series with the synchronizing motor 84 and in series with the brushes 90 and 91 for supplying the secondary light source 63, these elements being connected across the leads 117. Thus, whenever either of the switches 143 and 144 closes by entry of its roller into the notch 123a, the synchronizing motor 84 and the light source 63 on the secondary rotor 64 are energized.

The disc 124 is provided with a notch 124a therein and positioned adjacent the disc 124 are switches 145, 146 and 147 each provided with a roller adapted to enter the notch 124a. The switches 145 to 147 are normally open and close when the rollers thereof enter the notch 124a. These switches are all connected in parallel with respect to each other and in series with the printing solenoid 107, all of these elements being connected across the leads 117. Thus, whenever one of the rollers of the switches 145 to 147 enters the notch 124a, the printing solenoid is energized to print on the recording tape 101 the weight indicium on the printing head 106 which is opposite the recording tape at that instant.

The disc 125 is provided with a notch 125a and positioned adjacent this disc is a switch 148 having a roller adapted to enter the notch 125a. This switch is normally open and closes when its roller enters the notch 125a. The switch 148 is connected in series with the secondary light source 63 so that it energizes the secondary light source when the roller thereon enters the notch 125a in the disc 125. Thus, the secondary light source 63 may be energized by any one of the switches 143, 144 and 148 controlled by the discs 123 and 125. The switch 148 is connected in series with the light source 63 through a normally closed switch 149 which is opened by a relay 150 in series with the switch 148 in response to a relatively large current flow, as will be discussed hereinafter.

The zero limit switch 93 and the synchronizing motor 84 for the secondary rotor 64 are connected in series with each other and in series with the switch 148, the switches 143 and 144 being connected in parallel relative to each other and relative to the series-connected switches 93 and 148, whereby the synchronizing motor is energized only when the zero limit switch 93 and the switch 148 are closed, or when one of the switches 143 and 144 is closed. As previously discussed, the zero limit switch 93 is opened by the element 92 on the secondary rotor 64 when the secondary light source 63 is opposite the zero indicium on the scale dial 47, representing the return of the apparatus to rest upon completion of an operating cycle.

Considering the operation of the embodiment hereinbefore described with reference to Fig. 2 of the drawings and with reference to Figs. 4a, 4b, 4c, 4d, 4e, 4f and 4a' of the drawings, the latter showing successive positions of the discs 121 to 125, it will be assumed that the apparatus is about to begin an operating cycle, which means that the discs are in the position shown in Fig. 4a, or 4a', the latter being a duplicate of Fig. 4a to show that the same conditions obtain at the end of the cycle. With the discs in the positions of Fig. 4a, all of the elements are de-energized except for the green light 132, which is energized to signify that the apparatus is ready for operation. To start the apparatus in operation, the operator presses the start switch 134 momentarily. This energizes the timing motor 120 and the resulting movement of the discs 121 to 125 causes the switch 133 to disengage the notch 122a and thus close the parallel circuit through the timing motor. Thus, it is necessary to close the start switch 134 only momentarily. At the same time, the switch 131 disengages the notch 121a to extinguish the green light 132, which remains extinguished for the balance of the operating cycle to indicate that the apparatus is in operation.

When the discs 121 to 125 reach the positions shown in Fig. 4b, the switch 133 engages the notch 122b in the disc 122 and opens, thereby de-energizing the timing motor. At the same time, the switch 141 engages the notch 123a in the disc 123, thereby energizing the primary light source 61 and the dispensing means 31. Consequently, material is dispensed from the bin 21 into the weigh hopper 33, which causes the pointer 37 and the wands 51 and 52 to rotate. This dispensing of material from the bin 21 into the weigh hopper 33 continues until the wand 51 registers with the primary light source 61, which has previously been positioned opposite an indicium on the scale dial 47 representing the desired weight of the material to be dispensed from the bin 21. As soon as the wand 51 registers with the primary light source 61, the wand 51 conveys light to the photocell 67, with the result that the photoelectric switching means 69 energizes the timing motor 120, whereupon the timing motor rotates the discs 121 to 125 from the positions shown in Fig. 4b toward those shown in Fig. 4c. As soon as the discs start to rotate, the switch 141 disengages the notch 123a to de-energize the dispensing device 31, thereby terminating the dispensing of material from the bin 21 into the weigh hopper 33. Thus, the desired predetermined weight of material from the bin 21 has been dispensed. It will be noted that, at the same time, the primary light source 61 is extinguished, having served its function.

When the discs 121 to 125 reach the positions shown in Fig. 4c, the switch 133 engages the notch 122c in the disc 122 to again de-energize the timing motor 120. At the same time, the switch 144 engages the notch 123a in the disc 123 and closes, thereby energizing the synchronizing motor 84 and the secondary light source 63 through the ring and brush system, 88, 89, 90 and 91 and the normally closed switch 149. The synchronizing motor then rotates the secondary rotor 64 until the secondary light source 63 registers with the wand 52, whereupon the latter conveys light to the photocell 67. Consequently, the photoelectric switching means 69 again energizes the timing motor 120, thereupon disengaging the switch 133 from the notch 122c in the disc 122 to establish an alternative current path for the timing motor, and thereby disengaging the switch 144 from the notch 123a in the disc 123 to extinguish the light source 63 and to de-energize the synchronizing motor 84. Thus, at this stage, the light source 63 has been synchronized, positionally speaking, with the wands 51 and 52 and the pointer 37 so that it is opposite the indicium on the scale dial 47 corresponding to the weight of material dispensed from the bin 21. Also, the system of synchros 112, 113 has maintained positional synchronism between the light source 63 and the printing head 106 so that the indicium on the printing head which is now opposite the recording tape 101 represents the weight of material dispensed from the bin 21.

As the discs 121 to 125 rotate from the positions shown in Fig. 4c toward those shown in Fig. 4d, the switch 145 momentarily engages the notch 124a in the disc 124 to momentarily energize the printing solenoid 107, thereby printing the dispensed weight of the material from the bin 21 on the recording tape 101. Thus, a record of the weight of the material dispensed from the bin 21 is provided, which is an important feature of the invention. It will also be noted that this record was obtained without imposing any load whatsoever on the scale or measuring system, which is another important feature since it permits retaining the accuracy and sensitivity of the scale.

When the discs 121 to 125 arrive at the positions shown in Fig. 4d, the switch 133 engages the notch 122d in the disc 122 to again de-energize the timing motor 120. At the same time, the switch 142 engages the notch 123a in the disc 123 and closes to energize the dispensing means 32 and the primary light source 62. Consequently, material is dispensed from the second bin 22 into the weigh hopper 33, whereupon the scale 34 causes resumption of the rotational movement of the wands 51 and 52 and the pointer 37. When the wand 51 reaches the position wherein it registers with the primary light source 62, corresponding to a predetermined weight of material to be dispensed from the second bin 22, the wand 51 conveys light to the photocell 67, thereby closing the photoelectric switching means 69 to again energize the timing motor 120. As soon as the timing motor is again energized in this manner, it rotates the discs 121 to 125 from the positions illustrated in Fig. 4d to the positions illustrated in Fig. 4e, whereupon the switch 133 in series with the timing motor is closed to establish an alternative current path for the timing motor. At the same time, the switch 142 disengages the notch 123a in the disc 123 to de-energize the light source 62 and the dispensing device 32, thereby terminating the dispensing of material from the second bin 22 into the weigh hopper 33. Thus, the desired amount of material from the second bin has been dispensed into the weigh hopper.

When the discs 121 to 125 arrive at the positions shown in Fig. 4e, the switch 133 engages the notch 122e in the disc 122 so as to again de-energize the timing motor. At the same time, the switch 143 engages the notch 123a in the disc 123 and closes so as to again energize the secondary light source 63 and the synchronizing motor 84. Consequently, the synchronizing motor positionally synchronizes the secondary light source 63 with the wands 51 and 52 and the pointer 37 in the manner hereinbefore described. In other words, as soon as the secondary light source 63 registers with the wand 52, light is conveyed by this wand to the photocell 67, whereupon the photoelectric switching means 69 energizes the timing motor 120 to start the discs 121 to 125 on their way toward the positions illustrated in Fig. 4f. This causes the switch 143 to disengage the notch 123a in the disc 123 and open, thereby extinguishing the secondary light source 63 and the synchronizing motor 84 to cause the secondary light source to remain in registry with the wand 52. As before, the system of synchros 112 and 113 has maintained positional synchronism between the printing head 106 and the secondary light source 63 so that the indicium on the printing head which is now opposite the recording tape 101 corresponds to the indicium on the scale dial 47 opposite which the pointer 37 is disposed.

As the discs 121 to 125 rotate from the positions shown in Fig. 4e toward those shown in Fig. 4f, the switch 146 momentarily engages the notch 124a in the disc 124 to energize the printing solenoid 107, whereupon it presses the carbon tape 108 and the paper or recording tape 101 against the printing head 106 to print on the recording tape the total weight of the two materials dispensed from the bins 21 and 22, thereby providing a permanent record thereof. Again, this record is obtained without imposing any load on the scale system because of the photoelectric connection between the recording means 71 and the measuring means, which is an important feature.

When the discs 121 to 125 reach the positions shown in Fig. 4f, the switch 133 engages the notch 122f in the disc 122 to again de-energize the timing motor 120. At the same time, the switch 148 engages the notch 125a in the disc 125 to start the synchronizing motor 84 and energize the relay 150, which responds to the relatively large current required by the synchronizing motor. The relay 150 opens the switch 149 to prevent energizing the secondary light source 63, thereby preventing re-energizing the timing motor 120. Consequently, the discs 121 to 125 remain in the positions shown in Fig. 4f while the synchronizing motor 84 returns the secondary rotor 64 to zero so that the secondary light source 63 thereon is opposite the zero indicium on the scale dial 47, the synchronizing motor 84 being de-energized by the zero limit switch 93 when the secondary light source reaches the zero position. At the same time, the synchros 112 and 113 return the printing head 106 to zero. Also, when the synchronizing motor 84 is de-energized by the zero limit switch 93, the relay 150 is also de-energized to permit the switch 149 to close so as to energize the secondary light source 63, the current drawn by the latter being insufficient to re-energize the relay 150.

After the secondary rotor 64 has been returned to its zero position wherein the secondary light source 63 is opposite the zero indicium on the scale dial 47, the entire apparatus remains deenergized, except for the secondary light source 63, until such time as the weigh hopper 33 is emptied. As the weigh hopper 33 is emptied, the primary rotor 49 returns to zero and, when the wand 52 registers with the secondary light source 63 at zero, the timing motor 120 is again energized and rotates the discs 121 to 125 from the positions shown in Fig. 4f toward the positions shown in Fig. 4a'. Intermediate the positions shown in Figs. 4f and 4a', the notch 124a in the disc 124 engages the switch 147 momentarily to energize the printing solenoid 107. At this point in the operating cycle, the zero indicium on the printing head 106 faces the recording tape 101 since the printing head previously returned to zero in synchronism with the secondary rotor 64. Thus, the recording means 71 prints zero on the recording tape 101 as the discs 121 to 125 rotate toward the positions shown in Fig. 4a' to record the fact that the weigh hopper 33 was completely emptied prior to commencement of the subsequent operating cycle.

When the discs 121 to 125 reach the positions shown in Fig. 4a', the switch 133 again engages the notch 122a in the disc 122 to de-energize the timing motor 120. At the same time, the switch 131 engages the notch 121a in the disc 121 to energize the green light 132, thereby indicating that the apparatus is in condition for another operating cycle. The apparatus remains in this condition until such time as the operator closes the start switch 134 to initiate another operating cycle, which is a repetition of the operating cycle just described.

It will be understood that the embodiment of Figs. 2 to 4 of the drawings is of particular utility in installations wherein it is desirable to locate the printing head 106 and the elements associated therewith remote from the scale 34. For example, it may be desirable to produce the record of the weights of the dispensed materials in an office some distance from the actual dispensing installation, in which case the embodiment just described may be employed to good advantage. Also, if desired, the start switch 134 may be located adjacent the printing head 106 and its associated elements so that the installation may be remotely controlled if desired.

However, where remote recording of the dispensed weights is unnecessary, the secondary rotor 64 itself may be employed as a printing head, as illustrated in fragmentary form in Fig. 5 of the drawings. As suggested therein, each of the gear teeth on the periphery of the secondary rotor 64 with which the gear teeth of the last gear in the gear train 65 mesh may have indicia thereon corresponding to the indicia on the scale dial 47. Thus, by positioning the recording tape 101, the printing solenoid 107 and the carbon ribbon or tape 108 adjacent the secondary rotor 64 in the same relative positions as they occupy in the embodiment of Figs. 2 to 4 with respect to the printing head 106, the dispensed weights may be printed on the recording tape directly from the secondary rotor 64, which is an advantage of this embodiment when remote recording is not necessary.

In Figs. 6, 7 and 8 of the drawings there is shown another embodiment of the invention which, for the most part, is substantially identical to that illustrated in Figs. 2 to 4 of the drawings, the same reference numerals being employed for corresponding components as a matter of convenience. The principal difference between the embodiment of Figs. 6 to 8 and that of Figs. 2 to 4 is that the former includes an alternative circuit for energizing the synchronizing motor 84, this alternative circuit being independent of the circuits which include the switches 143, 144 and 148 for energizing the synchronizing motor. This alternative circuit includes a relay 160 in series with the dispensing devices 31 and 32 and the switches 141 and 142 for energizing them. The relay 160, when energized, is adapted to close a switch 161 which is connected in series with the synchronizing motor 84 independently of the switches 143, 144 and 148. The alternative circuit in which the switch 161 is disposed also includes two brushes 162 and 163 in series with the switch 161, the brush 162 being stationary and being carried by the housing section 42, and the brush 163 being carried by the secondary rotor 64 so as to move therewith. The brush 163 is supplied with current by a contact ring 164 which is carried by and insulated from the secondary rotor 64, the ring 164 being engaged by a brush 165 carried by the housing section 42. The brush 162 engages a continuous contact ring 166, best shown in Fig. 7, and the brush 163 engages a discontinuous contact ring 167. The contact rings 166 and 167 are mounted on an insulating member 168 which is, in turn, mounted on the indicator shaft 46, the wands 51 and 52 being connected to this insulating member. Thus, the contact rings 166 and 167 rotate with the wands 51 and 52. The contact rings 166 and 167 are electrically interconnected at 169 so that the synchronizing motor 84 is energized as long as the brush 163 is in engagement with the contact ring 167 and the switch 161 is closed. However, one end 170 of the contact ring 167 terminates a short distance from the wands 51 and 52 in the particular construction illustrated so that the brush 163 disengages the contact ring 167 to open the alternative circuit to the synchronizing motor 84 whenever the secondary light source 63 on the secondary rotor 64 approaches within a few degrees of the wand 52. As will be discussed in more detail in the following paragraph, this deenergizes the synchronizing motor before the secondary light source 63 is actually brought into registry with the wand 52.

Except for the effect of the alternative circuit for the synchronizing motor 84, the operation of the embodiment of Figs. 6 to 8 as thus far described is identical to that of the embodiment of Figs. 2 to 4 so that only the effect of this alternative circuit will be considered. When the dispensing device 31 is energized by the control means 70 in the manner hereinbefore described, the relay 160 is energized to close the switch 161. When the wands 51 and 52 start to rotate in response to the increasing weight of material in the weigh hopper 33, the contact ring 167 is rotated into engagement with the brush 163, thereby energizing the synchronizing motor 84. The synchronizing motor then rotates the secondary rotor 64 to tend to cause the secondary light source 63 to follow the wands 51 and 52. However, the secondary light source 63 can never quite catch up with the wands 51 and 52 since the brush 163 disengages the end 170 of the contact ring 167 whenever the secondary light source 63 comes within a few degrees of the wand 52, such disengagement also removing the slight drag which is applied to the weighing means when the follow-up means is in operation so that the sensitivity and accuracy of the weighing means is not affected at the final weighing. Thus, with this arrangement, the secondary light source 63 follows the wand 52 so that, after the predetermined amount of material has been dispensed from the bin 21, it is necessary subsequently to rotate the secondary rotor 64 through only a few degrees to achieve positional synchronism between the secondary light source 63 and the wand 52, thereby saving considerable time during the previously described synchronizing event in the operating cycle. This followup means operates in the same manner in connection with the dispensing device 32. In all other respects, the operation of the embodiment of Figs. 6 to 8 as thus far described is the same as that of the embodiment of Figs. 2 to 4.

One feature of the embodiment of Figs. 6 to 8 is that a reversible motor is employed for the synchronizing motor 84 so that it may return the secondary rotor 64 to zero in either the forward or reverse directions. A reversing switch 175 is connected in series with the reversible synchronizing motor and may be actuated to cause the secondary rotor 64 to return to zero in the forward direction if the secondary light source 63 has rotated through more than 180° by the time the last material has been dispensed, and may be actuated to return to zero in the reverse direction if the secondary rotor has rotated through less than 180° by the time the last material has been dispensed, thereby saving time in returning the secondary rotor to zero. If desired, the switch 175, which may be termed a home selector switch, may be actuated automatically in a manner about to be described. As shown in Fig. 8, the switch 175 is provided with a roller adapted to engage a raised cam 176 on the secondary rotor 64. The switch 175 is out of engagement with the cam 176 during approximately the first 180° of rotation of the rotor 64 and occupies the position shown diagrammatically in solid lines in Fig. 6. During approximately the second 180°, the switch 175 engages the cam 176 and occupies the broken-line position in Fig. 6. In operation, if the secondary rotor 64 has rotated less than 180° by the time the last material has been dispensed, the switch 148, when closed by the disc 125, completes the circuit to the synchronizing motor 84 through the zero limit switch 93 and the solid-line position of the reversing switch 175 to return the rotor 64 to zero in the reverse direction. Conversely, if the rotor 64 has rotated more than 180°, the cam 176 moves the switch 175 to its broken-line position so that, when the switch 148 is closed by the disc 125, the motor 84 is energized to return the rotor 64 to zero in the forward direction through the switches 93 and 148 and the broken-line position of the switch 175. Thus, the switch 175 causes the secondary rotor 64 to return to zero or home by the shortest route.

It will be understood that the embodiments disclosed herein may also be employed to weigh and record the weights of quantities of material or objects placed in the receptacle or hopper 33 independently of the dispensing devices. For example, packages may be weighed and their weights recorded in this manner.

Although I have disclosed various exemplary embodiments of my invention and have discussed possible modifications thereof, it will be understood that the invention may be embodied in other forms and is susceptible to other applications.

I claim as my invention:

1. In a dispensing and recording apparatus, the combination of: a dispensing device for dispensing a material; means operatively associated with said dispensing device for measuring the quantity of the material dispensed by said dispensing device, including a movable measuring element and means operatively connected to said movable measuring element for moving said movable measuring element a distance which is a function of the quantity of the material dispensed by said dispensing device; energizing means for energizing said dispensing device; de-energizing means operatively connected to said measuring element and responsive to movement thereof through a predetermined distance, corresponding to a predetermined quantity of the material to be dispensed, for de-energizing said dispensing device after said predetermined quantity of the material has been dispensed; means for recording the quantity of the material dispensed by said dispensing device, including a movable recording element; and means photoelectrically connected to said movable measuring element and operatively connected to said movable recording element for moving said movable recording element through a distance which is also a function of the quantity of the material dispensed by said dispensing device.

2. In a dispensing and recording apparatus, the combination of: a dispensing device for dispensing a quantity of a material; a receptacle for the quantity of the material dispensed by said dispensing device; means operatively associated with said receptacle for measuring the quantity of the material dispensed by said dispensing device, including a rotatable measuring element and means operatively connected to said rotatable measuring element for rotating said rotatable measuring element through an angle which is a function of the quantity of the material dispensed by said dispensing device; energizing means for energizing said dispensing device; de-energizing means operatively connected to said measuring element and responsive to rotation thereof through a predetermined angle, corresponding to a predetermined quantity of the material to be dispensed, for de-energizing said dispensing device after said predetermined quantity of the material has been dispensed; means for recording the quantity of the material dispensed by said dispensing device, including a rotatable recording element; and means photoelectrically connected to said rotatable measuring element and operatively connected to said rotatable recording element for rotating said rotatable recording element through an angle which is also a function of the quantity of the material dispensed by said dispensing device.

3. In a dispensing and recording apparatus, the combination of: a dispensing device for dispensing a quantity of a material; scale means receiving the material from said dispensing device for weighing the quantity of the material dispensed by said dispensing device, including a rotatable scale element and including means operatively connected to said rotatable scale element for rotating said rotatable scale element through an angle which is a function of the weight of the material dispensed by said dispensing device; energizing means for energizing said dispensing device; de-energizing means operatively connected to said scale element and responsive to rotation thereof through a predetermined angle, corresponding to a predetermined quantity of the material to be dispensed, for de-energizing said dispensing device after said predetermined quantity of the material has been dispensed; means for recording the weight of the material dispensed by said dispensing device, including a rotatable recording element; and means photoelectrically connected to said rotatable scale element and operatively connected to said rotatable recording element for rotating said rotatable recording element through an angle which is also a function of the weight of the material dispensed by said dispensing device.

4. In a dispensing and recording apparatus, the combination of: a dispensing device for dispensing a material; means operatively associated with said dispensing device for measuring the quantity of the material dispensed by said dispensing device, including a movable measuring element and means operatively connected to said movable measuring element for moving said movable measuring element a distance which is a function of the quantity of the material dispensed by said dispensing device; energizing means for energizing said dispensing device; de-energizing means operatively connected to said measuring element and responsive to movement thereof through a predetermined distance, corresponding to a predetermined quantity of the material to be dispensed, for de-energizing said dispensing device after said predetermined quantity of the material has been dispensed; means for recording the quantity of the material dispensed by said dispensing device, including a movable recording element; actuating means operatively connected to said movable recording element for moving said movable recording element; means for energizing said actuating means; and means, including photoelectric means, operatively connecting said movable recording element to said movable measuring element for de-energizing said actuating means upon movement of said movable recording element by said actuating means through a distance which is also a function of the quantity of the material dispensed by said dispensing device.

5. A dispensing and recording apparatus according to claim 5 wherein the means defined in the last clause includes: photoelectric switch means operatively connected to and controlling said actuating means; a light source movable along a path adjacent and parallel to the path of movement of said movable measuring element into registry with said movable measuring element, the latter including means for conveying light from said light source to said photoelectric switch means to actuate said photoelectric switch means; and means carrying said light source for moving said light source into registry with said movable measuring element.

6. A dispensing and recording apparatus according to claim 5 wherein the means defined in the last clause includes: photoelectric switch means operatively connected to and controlling said actuating means; a light source movable along a path adjacent and parallel to the path of movement of said movable measuring element into registry with said movable measuring element, the latter including means for conveying light from said light source to said photoelectric switch means to actuate said photoelectric switch means; and means carrying said light source for moving said light source into registry with said movable measuring element, said means carrying said light source forming part of said movable recording element.

7. A dispensing and recording apparatus according to claim 5 wherein the means defined in the last clause includes: photoelectric switch means operatively connected to and controlling said actuating means; a light source movable along a path adjacent and parallel to the path of movement of said movable measuring element into registry with said movable measuring element, the latter including means for conveying light from said light source to said photoelectric switch means to actuate said photoelectric switch means; and means carrying said light source for moving said light source into registry with said movable measuring element, said means carrying said light source including a movable member to which said actuating means is operatively connected, said apparatus including means for moving said movable member and means for moving said movable recording element in synchronism.

8. In an apparatus of the character described, the combination of: at least two operating circuits; a controlling circuit including switching means for closing and opening said operating circuits in sequence and including photoelectric means for actuating said switching means; movable means for conveying light to said photoelectric means; a number of light sources equal to the number of operating circuits spaced apart adjacent the path of said movable means; another light source movable along a path adjacent the path of said movable means; and means operatively connected to said switching means and controlled thereby for moving said other light source into registry with said movable light-conveying means.

9. In an apparatus of the character described, the combination of: at least two operating circuits; a controlling circuit including switching means for closing and opening said operating circuits in sequence and including photoelectric means for actuating said switching means; movable means for conveying light to said photoelectric means; a number of light sources equal to the number of operating circuits spaced apart adjacent the path of said movable means; another light source movable along a path adjacent the path of said movable means; and actuating means operatively connected to said other light source for moving said other light source along its path, said switching means including elements connected in circuit with said actuating means for periodically energizing said actuating means and for de-energizing said actuating means whenever said other light source registers with said movable light-conveying means to deliver light to said photoelectric means.

10. In an apparatus of the character described, the combination of: movable light-conveying means; a light source movable along a path adjacent and parallel to the path of said movable light-conveying means; actuating means for moving said light source along its path, said actuating means being operatively connected to said light source; switching means in circuit with said actuating means and closable to energize said actuating means; and stationary photoelectric means positioned adjacent said movable light-conveying means to receive light therefrom for opening said switching means to de-energize said actuating means, whereby said actuating means is de-energized to terminate movement of said light source when said light source is moved into registry with said movable light-conveying means to deliver light to said photoelectric means.

11. In an apparatus of the character described, the combination of: an actuating device disposed adjacent a circular path for producing an actuating signal; stationary switching means actuable by an actuating signal applied thereto; a primary rotor rotatable about the axis of said circular path and having an element which is movable along said circular path, said primary rotor including means for conveying said actuating signal to said switching means; a secondary rotor coaxial with said primary rotor and carrying said actuating device, said secondary rotor moving said actuating device along said circular path upon rotation thereof; and actuating means controlled by and connected in circuit with said switching means for rotating said secondary rotor to cause said actuating device to register with said element of said primary rotor.

12. In an apparatus of the character described, the combination of: a light source disposed adjacent a circular path; a normally-closed switch element; stationary photoelectric means connected to said switch element and actuable by light received from said light source to open said switch element; a primary rotor rotatable about the axis of said circular path and having an element which is movable along said circular path, for conveying light from said light source to said photoelectric means when said element of said primary rotor registers with said light source; a secondary rotor coaxial with said primary rotor and carrying said light source, said secondary rotor moving said light source along said circular path upon rotation thereof; and actuating means controlled by and connected in circuit with said switch element for rotating said secondary rotor to cause said light source to register with said element of said primary rotor, whereby said photoelectric means opens said switch element to deenergize said actuating means with said light source in registry with said element of said primary rotor.

13. In an apparatus of the character described, the combination of: primary actuating devices disposed adjacent a primary circular path for producing primary actuating signals; a secondary actuating device adjacent a secondary circular path coaxial with said primary circular path for producing a secondary actuating signal; switching means actuable by primary and secondary actuating signals from said primary and secondary actuating devices; a primary rotor disposed between said primary and secondary actuating devices and said switching means, said primary rotor having a primary element movable along said primary circular path into registry with said primary actuating devices, and having a secondary element movable along said secondary circular path into registry with said secondary actuating device, said primary rotor including means for conveying said primary and secondary actuating signals to said switching means to actuate said switching means; primary actuating means controlled by said switching means for rotating said primary rotor; a secondary rotor coaxial with said primary rotor and carrying said secondary actuating device, said secondary rotor moving said secondary actuating device along said secondary circular path upon rotation of said secondary rotor; and secondary actuating means operatively connected to and controlled by said switching means for rotating said secondary rotor.

14. An apparatus as defined in claim 13 wherein said switching means includes primary switch elements operatively connected to said primary actuating means and includes means for opening said primary switch elements to de-energize said primary actuating means whenever said primary element of said primary rotor registers with said primary actuating devices to deliver primary actuating signals to said switching means, said switching means also including a secondary switch element operatively connected to said secondary actuating means and including means for opening said secondary switch element to de-energize said secondary actuating means whenever said secondary actuating device moves into registry with said secondary element of said primary rotor to deliver said secondary actuating signal to said switching means.

15. An apparatus as defined in claim 14 wherein said primary actuating means includes dispensing devices for dispensing quantities of materials and includes means responsive to the quantities of the materials dispensed by said dispensing devices for rotating said primary rotor, said primary switch elements being operatively connected to said dispensing devices, respectively.

16. An apparatus as defined in claim 15 wherein said primary and secondary actuating devices are light sources, wherein said switching means comprises photoelectric switching means actuable by light from said light sources, and wherein said signal-conveying means of said primary rotor comprises means for conveying light from said light sources to said photoelectric switching means.

17. An apparatus according to claim 16 including recording means operatively connected to and actuable by said secondary rotor for recording the quantities of the materials dispensed by said dispensing devices.

18. In a dispensing and recording apparatus, the combination of: an electrically controlled dispensing device for dispensing a material; electrically operable control means operatively connected to said dispensing device for controlling said dispensing device; photoelectric switching means operatively connected to said control means to control energization of said control means, said photoelectric switching means being actuable by light applied thereto; a primary light source disposed adjacent a primary circular path; a secondary light source disposed adjacent a secondary circular path coaxial with said primary circular path; a primary rotor having a primary element movable along said primary circular path into registry with said primary light source, said primary rotor also having a secondary element movable along said secondary circular path and adapted to register with said secondary light source, said primary rotor including means for conveying light from said primary and secondary light sources to said photoelectric switching means to actuate said photoelectric switching means; means responsive to the weight of the material dispensed by said dispensing device for rotating said primary rotor; means for recording the weight of the material dispensed by said dispensing device including a secondary rotor coaxial with said primary rotor and carrying said secondary light source, said secondary rotor moving said secondary light source along said secondary circular path upon rotation of said secondary rotor; and means operatively connected to and controlled by said control means for rotating said secondary rotor to cause said secondary light source to register with said secondary element of said primary rotor.

19. A dispensing and recording apparatus as defined in claim 18 wherein said recording means includes: a rotatable recording element; means operatively connecting said recording element and said secondary rotor for rotating said recording element in synchronism with said secondary rotor; and means operatively connected to and controlled by said control means for moving a recording medium into engagement with said recording element.

20. In a dispensing and recording apparatus, the combination of: an electrically controlled dispensing device for dispensing a material; electrically operable control means rotatable through primary and secondary positions and including switch means for controlling said dispensing device when in said primary position, said control means including switch means for de-energizing itself when in said primary and secondary positions; photoelectric switching means operatively connected to said control means for energizing said control means, said photoelectric switching means being actuable by light applied thereto; a primary light source disposed adjacent a primary circular path; a secondary light source disposed adjacent a secondary circular path coaxial with said primary circular path; a primary rotor having a primary element movable along said primary circular path into registry with said primary light source, said primary rotor also having a secondary element movable along said secondary circular path and adapted to register with said secondary light source, said primary rotor including means for conveying light from said primary and secondary light sources to said photoelectric switching means to actuate said photoelectric switching means, whereby the latter energizes said control means; means responsive to the weight of the material dispensed by said dispensing device for rotating said primary rotor; recording means for recording the weight of the material dispensed by said dispensing device including a secondary rotor coaxial with said primary rotor and carrying said secondary light source, said secondary rotor moving said secondary light source along said secondary circular path upon rotation of said secondary rotor; and means operatively connected to said control means and energizable thereby when in said secondary position for rotating said secondary rotor to cause said secondary light source to register with said secondary element of said primary rotor.

21. A recording and dispensing apparatus as defined in claim 20 wherein said recording means includes recording indicia on said secondary rotor and includes means operatively connected to and energizable by said control means when in a tertiary position for moving a recording medium into engagement with said recording indicia.

22. A dispensing and recording apparatus according to claim 20 wherein said recording means includes a rotatable recording element having recording indicia thereon, includes means operatively connecting said secondary rotor and said rotatable recording element for rotating said recording element in synchronism with said secondary rotor, and includes means operatively connected to and energizable by said control means in a tertiary position for moving a recording medium into engagement with said recording indicia.

23. In an apparatus of the character described, the combination of: a dispensing device for dispensing a quantity of a material; scale means adapted to receive a quantity of a material for weighing the quantity of the material, including a rotatable scale element and including means operatively connected to said rotatable scale element for rotating said rotatable scale element through an angle which is a function of the weight of the material; energizing means for energizing said dispensing device; de-energizing means operatively connected to said scale element and responsive to rotation thereof through a predetermined angle, corresponding to a predetermined quantity of the material to be dispensed, for de-energizing said dispensing device after said predetermined quantity of the material has been dispensed; means for recording the weight of the material, including a rotatable recording element; and means photoelectrically connected to said rotatable scale element and operatively connected to said rotatable recording element for rotating said rotatable recording element through an angle which is also a function of the weight of the material.

24. In combination: movable light-conveying means; a first light source adjacent the path of said light-conveying means; actuating means for moving said light-conveying means along its path; means for energizing said actuating means; photoelectric switching means including photoelectric means adjacent said light-conveying means to receive light therefrom when said light-conveying means registers with said first light source for de-energizing said actuating means; a second light source movable along a path adjacent and parallel to the path of said light-conveying means; operating means for moving said second light source along its path, said operating means being operatively connected to said second light source; and means for energizing said operating means, said operating means being connected to said photoelectric switching means so as to be de-energized thereby when light from said second light source is conveyed to said photoelectric means by said light-conveying means upon registry of said second light source with said light-conveying means.

WALTER E. SAXE.

References Cited in the file of this patent

UNITED STATES PATENTS

| Number | Name | Date |
| --- | --- | --- |
| 764,192 | James | July 5, 1904 |
| 763,530 | James | July 5, 1904 |
| 807,863 | Phillips | Dec. 19, 1905 |
| 2,007,317 | Bohuszewicz | July 9, 1935 |
| 2,024,793 | Bauml | Dec. 17, 1935 |
| 2,046,005 | Sprecker | June 20, 1936 |
| 2,132,237 | Haegele | Oct. 4, 1938 |
| 2,142,251 | Nunan | Jan. 3, 1939 |
| 2,309,117 | John | Jan. 26, 1943 |
| 2,313,179 | Sprecker et al. | Mar. 9, 1943 |
| 2,346,117 | Stabler | Apr. 4, 1944 |
| 2,398,887 | Drinnon | Apr. 23, 1946 |
| 2,477,821 | Potts | Aug. 2, 1949 |

FOREIGN PATENTS

| Number | Country | Date |
| --- | --- | --- |
| 435,934 | Great Britain | Sept. 16, 1935 |
| 618,710 | Germany | Sept. 16, 1935 |